United States Patent

[11] 3,616,012

| [72] | Inventor | Antonio Salvarani<br>Baganzola, Parma, Italy |
|---|---|---|
| [21] | Appl. No. | 705,336 |
| [22] | Filed | Feb. 14, 1968 |
| [45] | Patented | Oct. 26, 1971 |
| [73] | Assignee | Salvarani Societa in nome Collettivo<br>Parma, Italy |
| [32] | Priority | Feb. 20, 1967 |
| [33] | | Italy |
| [31] | | 12837 |

[54] PLASTIC LAMINATES BENDING METHOD
2 Claims, 4 Drawing Figs.

[52] U.S. Cl. .................................................. 156/222,
156/475, 264/295
[51] Int. Cl. ..................................................... B31f 1/00
[50] Field of Search ........................................... 264/294,
295; 156/212, 213, 214, 216, 222, 461, 475

[56] References Cited
UNITED STATES PATENTS

| 3,131,116 | 4/1964 | Pounds ......................... | 161/258 |
| 3,296,052 | 1/1967 | Bechtold ....................... | 156/212 X |
| 3,296,056 | 1/1967 | Bechtold ....................... | 156/461 |
| 3,378,433 | 4/1968 | Palazzolo et al. ............. | 161/156 |
| 3,444,589 | 5/1969 | Bowin ........................... | 264/294 |

Primary Examiner—Samuel W. Engle
Attorney—Stevens, Davis, Miller & Mosher

ABSTRACT: This invention refers to a method and machine for producing plastic laminate elements having a plurality of flat faces at substantially right angles to each other and with sharp corners, said method consisting in forming said flat faces on wide radius arcuate moulding surfaces.

PATENTED OCT 26 1971     3,616,012
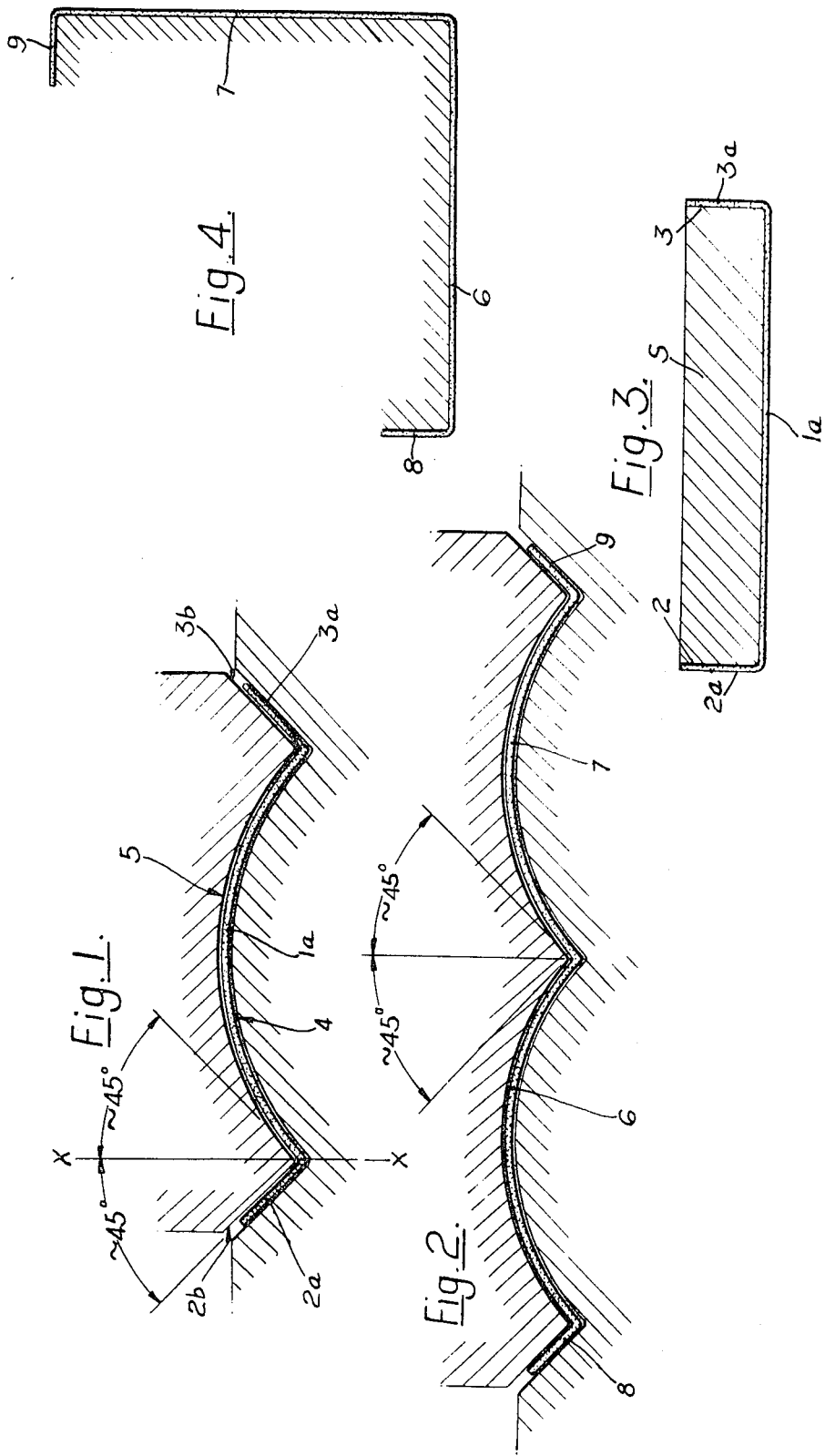

3,616,012

PLASTIC LAMINATES BENDING METHOD

BACKGROUND OF THE INVENTION

1. Field of the Invention

The problem of producing multifaced elements of plastic laminate with surfaces forming sharp-edged right angles between them has for instance arisen in the field of coated surface furniture manufacturing, particularly kitchen furniture, wherein the coating is effected by at least one major flat surface, at the ends of which right angle bent surfaces are connected. It is in fact known that, for example in door coating, at least the front surface and the two adjoining sides are coated with the same plastic laminate.

2. Description of the Prior Art

As is well known, plastic laminates are presently produced from a set of sheets soaked in thermosetting resins placed in overlapping relationship up to the desired thickness and processed in dies at a high pressure and temperature. The subsequent hardening of the resins will result in a laminate having excellent strength and hardness features.

However, also in the reduced thicknesses presently in use, these laminates show a very poor flexibility and are hardly inclined to bending, so that it is practically impossible to obtain a small radius bending thereof without causing their breakage.

In order to overcome this disadvantage, it has already been proposed to produce a nonfully processed laminate, that is a laminate wherein the resin hardening has not been thoroughly completed. The laminate thus produced is reasonably subject to bending and, on an industrial scale, bendings can be obtained having a radius up to 8-9 mm., but with lower strength, hardness and durability features.

Indeed, laminates can be produced with remarkably bent or even sharp edge bent portions, also with high strength and hardness features, but only by using shaped moulding dies, so that, from the beginning of the resin hardening process the laminate will take the final bent shape. However, also this system has substantial restrictions, as known: in fact, in presently used presses having two oppositely acting dies, it is extremely difficult to apply evenly the high pressures (of about 100 kg/sq. cm.) required on the areas wherein the plane of the opposite surfaces of the die forms with the direction of the pressure application a rather small angle.

SUMMARY OF THE INVENTION

According to the present invention this problem is now solved in a simple, practical and brilliant manner: to this end, a plastic material moulding method is provided for—of the type wherein the laminate will take its final shape in only one pressing and full hardening operation—in which the converging surfaces of an angle bent portion are arranged, at least in the proximity of the angle, along planes forming a substantially symmetrical angle with respect to the application line of moulding pressure, and the flat connecting surfaces of such angle bent portions are arranged in arcuate surfaces having a wide bending radius.

After shakeout and on application of the laminate onto the surface to be coated, it is possible by this system to lay and straighten such arcuate surfaces on the planes on which they are to be applied, at the same time effecting a correct orientation of the angle bent portions.

This invention also relates to an apparatus for carrying out the above method which apparatus is substantially characterized in that it comprises two opposite die elements, each of which has main arcuate surfaces of a wide bending radius and is adapted to carry out the moulding of at least part of the flat surfaces of the plastic laminate element to be produced.

BRIEF DESCRIPTION OF THE DRAWINGS

The invention will be more clearly described and explained on the ground of some exemplary embodiments, reference being made to the accompanying drawings which are merely indicative and in which:

FIG. 1 diagrammatically shows the die for moulding a coating for a kitchen furniture door FIG. 2 diagrammatically shows the die for moulding a coating for a two-face boxlike element and FIGS. 3 and 4 are diagrammatic sectional view of the elements as made with the laminate according to FIGS. 1 and 2, respectively.

DESCRIPTION OF THE PREFERRED EMBODIMENTS

Referring to the drawings, FIG. 3 illustrates an exemplary application of the invention to the manufacturing of a kitchen furniture door, coated with plastic laminate on the front face and on the two visible sides; surface 1 of this door is practically sharp edge connected with the two sides 2 and 3, substantially arranged at 90° relatively to the plane of surface 1. For the production of this integral coating, the die of FIG. 1 is employed, wherein the portion 1 of the coating is formed between the two opposite arcuate surfaces 4 and 5 of the die, said arcuate surfaces having a large bending radius. These arcuate surfaces terminate in positions in which the tangential plane forms an angle of about 45° with the axes x—x of pressure application to the die. At the ends of the arcuate surface the two elements of the die have further surfaces 2b and 3b, symmetrically disposed in respect to the axes x—x, with a similar angle of about 45°, for forming sides 2a and 3b respectively thus the sides 2a and 3a form substantially right angles with the respectively connected ends of the arcuate surface. In other words we may say that any flat surface is produced on an arcuate surface, substantially corresponding to one fourth of a large radius circumference, the side surfaces being arranged substantially according to radial alignments, passing through the ends of said arcuate surface.

When taken out of the die, the moulded and thoroughly hardened piece retains the shape as shown in FIG. 1 however, the wide radius bending surface 1a shows sufficient flexibility to be planarly straightened. This is done upon application on the door: surface 1a is laid flat and glued on the front face of door S, whereas sides 2a and 3a are arranged to form a correct angle of 90°, as shown in FIG. 3.

In the case of FIG. 2, a laminate is produced, the shape of which has two subsequent arcuate surfaces 6 and 7, respectively, bent with a large bending radius, and two substantially flat end surfaces 8 and 9. This laminate is used for coating a boxlike element, such as that shown in FIG. 4, wherein two large surfaces 6 and 7 at right angles each other are defined by edges 8 and 9 which are also at right angles relatively to the respective large surfaces.

It is quite obvious that by arrangements similar to those shown it will be possible to produce a plurality of integral coatings, having several surfaces disposed substantially at right angles towards one another for example, a coating can be produced for the four subsequent sides of a parallelepiped element with a die having four subsequent arcuate surfaces, such as those indicated with 6 and 7 in FIG. 2.

However, it is to be understood that there can be further embodiments of the present invention, other than those shown, without departing for this from the scope of the invention.

I claim:

1 A method for producing in a single operation substantially U-shaped plastic laminate coatings, particularly for furniture elements, said coating having at least three faces at substantially right angles with one another and with sharp corners between the faces comprising the steps of placing a stack of overlapping, resin impregnated fiborous sheets in a two-piece die, moving the two pieces of the die together along a pressing axis, pressing each angle bent portion of the U-shaped laminate, at least in the proximity of the angle, in a substantially V-shaped portion of the die the surfaces of which are at substantially right angles with each other and substantially symmetrically oblique in respect to the pressing axis, and pressing at least the plane flat portion of the U-shaped laminate, intermediate between two successives angle bent portions, in an arcuate part of the die.

2. A method of producing in a single operation substantially U-shaped plastic laminate coatings in a die having two mating parts each having a central portion of a large radius arcuate configuration terminating at portions in which the tangential plane form an angle of about 45° with the pressing axis and adjacent planar end and portions forming an angle of about 45° with said axis and symmetrical with the ends of said arcuate surface, comprising the steps of placing an overlapping stack of resin impregnated fiborous sheets between said die parts, and pressing said sheets between said die parts at high temperature and pressure to form said shaped plastic laminate.

* * * * *

UNITED STATES PATENT OFFICE
CERTIFICATE OF CORRECTION

Patent No. 3,616,012            Dated October 26, 1971

Inventor(s) Antonio SALVARANI

It is certified that error appears in the above-identified patent and that said Letters Patent are hereby corrected as shown below:

Column 3, in Claim 2, line 7 in the column, "form" should read --forms--.

Signed and sealed this 4th day of July 1972.

(SEAL)
Attest:

EDWARD M. FLETCHER, JR.            ROBERT GOTTSCHALK
Attesting Officer                      Commissioner of Patents